United States Patent
Nishio

[11] Patent Number: 5,450,120
[45] Date of Patent: Sep. 12, 1995

[54] METHOD OF EXPOSURE WITH PLURALITY OF LIGHT BEAMS

[75] Inventor: Yuji Nishio, Kanagawa, Japan

[73] Assignee: Fuji Photo Film Co., Ltd., Kanagawa, Japan

[21] Appl. No.: 123,473

[22] Filed: Sep. 20, 1993

[30] Foreign Application Priority Data

Sep. 21, 1992 [JP] Japan ................................. 4-251661

[51] Int. Cl.$^6$ .......................... B41J 2/47; G11B 7/08; H04N 1/40
[52] U.S. Cl. ..................................... 347/249; 358/474
[58] Field of Search ........................... 355/228, 229; 346/107 R, 108, 160; 358/474, 480, 481; 347/249

[56] References Cited

U.S. PATENT DOCUMENTS

| | | | |
|---|---|---|---|
| 5,087,928 | 2/1992 | Okino | 346/108 |
| 5,151,714 | 9/1992 | Okino et al. | 346/108 |
| 5,258,856 | 11/1993 | Shinada | 358/474 |
| 5,323,183 | 6/1994 | Tateoka et al. | 346/108 |

Primary Examiner—Fred L. Braun
Attorney, Agent, or Firm—Sughrue, Mion, Zinn, Macpeak & Seas

[57] ABSTRACT

A method of making a two-dimensional exposure on an object with a plurality of light beams by a main scan for making scans with the light beams in one direction and a sub-scan for making scans with the light beams in a direction intersecting the direction of the main scan. In a distance detecting step, a distance between a portion exposed to at least one of the plurality of light beams and a portion exposed to respective other light beams is detected when respective the plurality of light beams are exposed toward an object. In an exposure start-timing changing step, the timing for starting an exposure to be effected by at least one of the main scan and sub-scan made with respective the plurality of light beams is changed according to the distance in such a manner that the positions of the portions exposed to the plurality of light beams are substantially identical.

20 Claims, 15 Drawing Sheets

LINE DATA ①

LINE DATA ②

LINE DATA ③

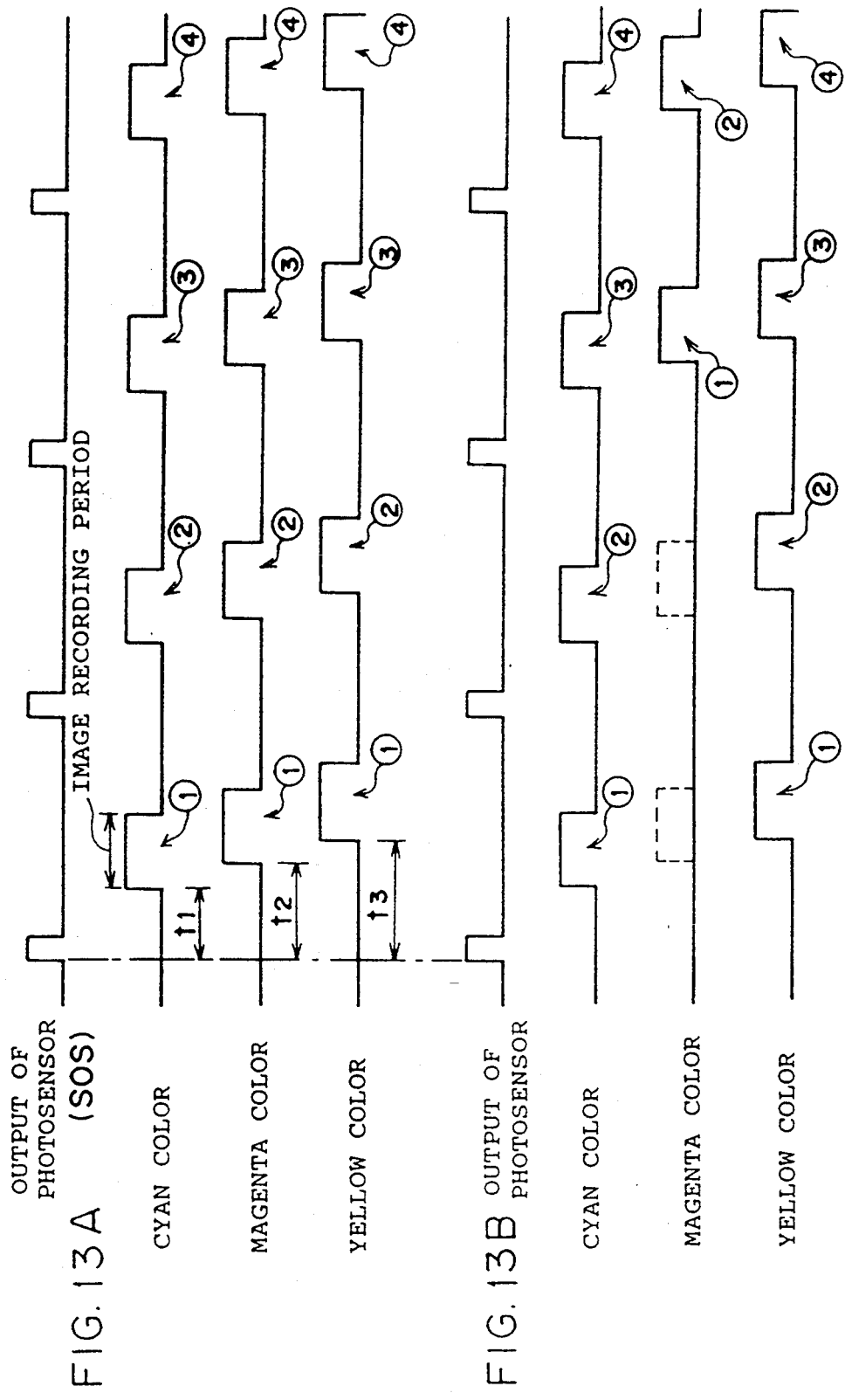

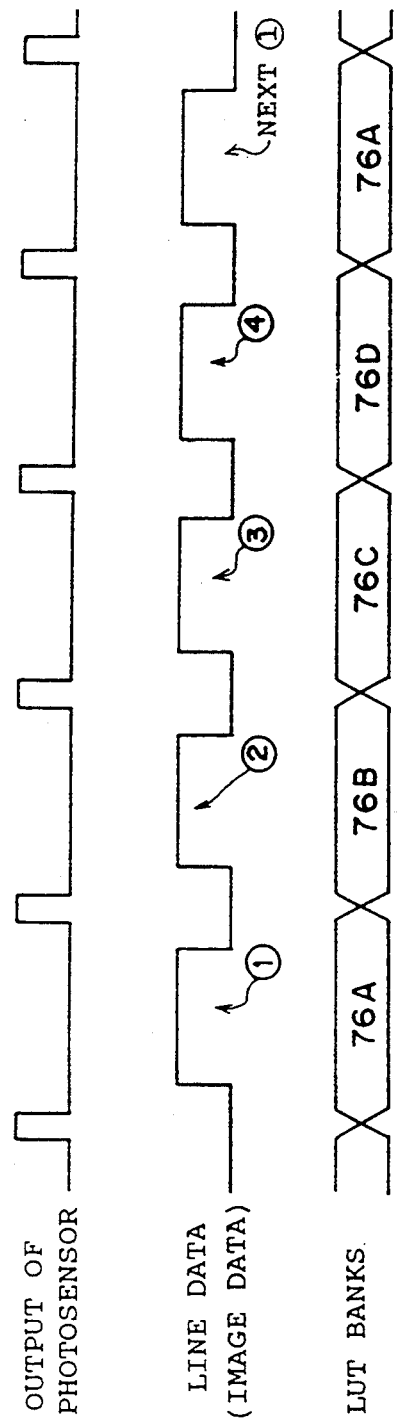

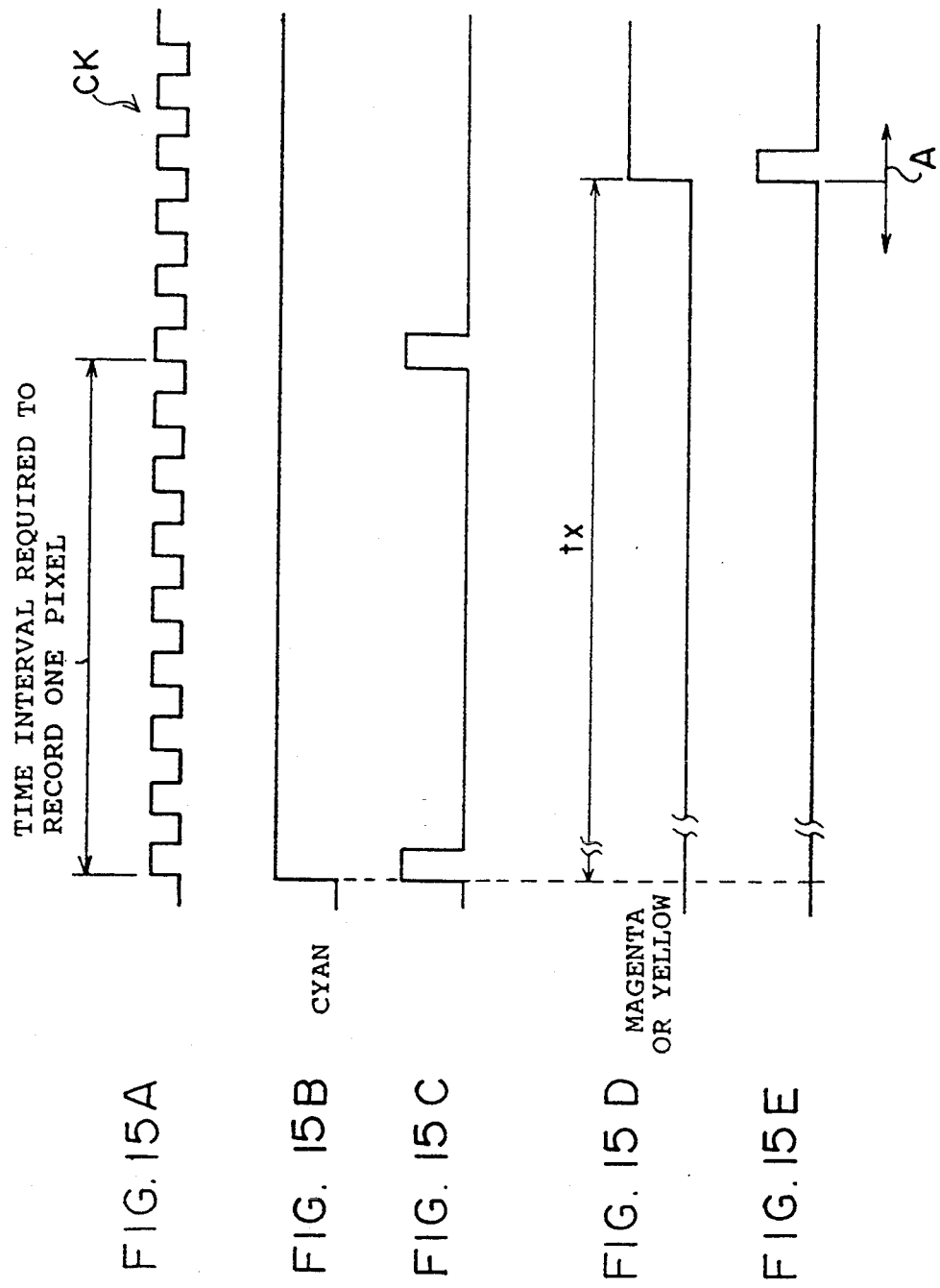

METHOD OF EXPOSURE WITH PLURALITY OF LIGHT BEAMS

BACKGROUND OF THE INVENTION

1. Field of the Invention

The present invention relates to an exposure method with a plurality of light beams to record or read an image by causing the plurality of light beams to scan two-dimensionally.

2. Description of the Related Art

An image recording apparatus for subjecting an original to slit exposure and recording an image on an image recording material such as a photosensitive material is known. An illustrative example of the image recording apparatus includes an image recording apparatus wherein two kinds of image recording materials, i.e., a photosensitive material and an image receiving material are used and an image on the exposed photosensitive material is transferred onto the image-receiving material by a thermal development/transfer process thereby processing the image.

In the thermal development/transfer type image recording apparatus, the photosensitive material and the image receiving material are respectively wound and accommodated in roll form within magazines the insides of which are in light-intransmissive states. The materials are used by being successively pulled out from their respective magazines for each image recording process. Further, the image recording apparatus is provided with a thermal development/transfer unit. Slit images on an original are successively exposed onto the photosensitive material which is drawn a predetermined length from the magazine and cut while the photosensitive material is being nipped and conveyed by conveying rollers. Thereafter, the photosensitive material is conveyed to the thermal development/transfer unit. On the other hand, the image receiving material is pulled out a predetermined length from the magazine and cut in a manner similar to the photosensitive material. Thereafter, the image receiving material is delivered into the thermal development/transfer unit by the conveying rollers in synchronism with the conveyance of the photosensitive material. In the thermal development/transfer unit, the photosensitive material is thermally developed while being nipped and conveyed in a state superimposed on the image receiving material so as to transfer an image onto the image receiving material. Thus, a desired image is recorded on the image receiving material.

In the image recording apparatus referred to above, there is known an image recording apparatus which main-scans with light beams such as laser beams in one direction and sub-scans simultaneously or successively with the main scanning to convey a photosensitive material in a direction intersecting the direction of the main scanning and forms a color image onto the photosensitive material.

In this type of image recording apparatus, three-color laser beams are combined into one laser beam and the photosensitive material is exposed by being main-scanned and sub-scanned with the combined laser beam.

Since the above image recording apparatus requires an image recording with no color variations and has high color reproduction, laser beams of three colors produced by image data at a certain portion should be exposed onto the same portion on the photosensitive material. Therefore, there is proposed an image recording apparatus for combining the three color laser beams into one laser beam group on an optical path of an optical system prior to the scan optical system referred to above and exposing a photosensitive material by scanning it with the one laser beam.

However, in this type of image recording apparatus, an adjusting device is complex in structure and fine adjustment is required to bring the three laser beams into the same state, i.e., a state converged in the same direction and in the form of the same beam on the same optical path.

Even if the optical system is adjusted as described above, points to be adjusted are often shifted or displaced due to vibrations produced when the image recording apparatus is conveyed or moved. As a result, the complex and fine adjustment of the optical system must be made again. Further, the points to be adjusted in the optical system are often displaced due to a secular change in the apparatus. Therefore, such points are under the necessity of readjustment.

SUMMARY OF THE INVENTION

With the foregoing in view, it is an object of the present invention to provide an exposure method utilizing a plurality of light beams, wherein color variations can be corrected, no adjustment of a complex optical system is needed and an image whose finished state is satisfactory can be obtained.

According to a first aspect of the present invention, there is provided a method of making a two-dimensional exposure with a plurality of light beams by a main scan for making scans with the light beams in one direction and a sub-scan for making scans with said light beams in a direction intersecting the direction of the main scan, comprising the steps of: a distance detecting step for detecting a distance between a portion exposed to at least one of the plurality of light beams and a portion exposed to respective other light beams when respective the plurality of light beams are exposed toward an object, and an exposure start-timing changing step for changing a timing for starting an exposure to be effected by at least one of the main scan and sub-scan made with respective the plurality of light beams, according to the distance in such a manner that the positions of the portions exposed to the plurality of light beams are substantially identical.

According to a second aspect of the present invention, there is provided a method of effecting, a predetermined number of times and in a predetermined direction, a main scan for making scans with a plurality of light beams in one direction and a sub-scan for making scans with the light beams in a direction intersecting the direction of the main scan in such a manner that at least adjacent portions to be exposed overlap, to thereby make a two-dimensional exposure, comprising the steps of: a distance detecting step for detecting a distance between a portion exposed to at least one of the plurality of light beams and a portion exposed to respective other light beams when respective the plurality of light beams are exposed toward an object, and an exposure start-timing changing step for changing a timing for starting an exposure to be effected by at least one of the main scan and sub-scan made with respective the plurality of light beams, according to the distance in such a manner that the positions of the portions exposed to the plurality of light beams are substantially identical.

According to a third aspect of the present invention, there is provided the method wherein the object exposed to the plurality of light beams is a photosensitive material and the sub-scan is made so as to convey the photosensitive material in the direction intersecting the direction of the main scan.

According to the first aspect of the present invention, the two-dimensional exposure is made by the main scan for making the scans with the light beams in one direction and the sub-scan for making the scans with the light beams in the direction intersecting the direction of the main scan. As described in the third aspect of the present invention, the sub-scan can also be made by conveying the photosensitive material in the direction intersecting the main scanning direction. The distance between the portion exposed to at least one of the plurality of light beams and the portion exposed to respective other light beams when respective the plurality of light beams are exposed toward an object, is determined. The main scan and sub-scan are respectively made by the plurality of light beams. However, the determined distance corresponds to a position displacement of each of the plurality of light beams from the same portion. Thus, when the timing for starting the exposure to be effected by at least one of the main scan and sub-scan made with the respective light beams is changed according to the distance, i.e., the position displacement, the portions corresponding to the respective light beams, which are exposed to the plurality of light beams are brought to the same portion. Therefore, any variation in color is no longer produced upon recording a color image by a plurality of light beams and reading it by the light beams, for example.

According to the second aspect of the present invention, the main scan for making the scans with the plurality of light beams in one direction and the sub-scan for making the scans with the light beams in the direction intersecting the direction of the main scan are made a predetermined number of times in the predetermined direction in such a manner that at least adjacent portions to be exposed overlap each other, thereby making the two-dimensional exposure. The scans made the predetermined number of times in the predetermined direction correspond to, for example, a multiple exposure in which exposures are made by at least one of the main scan and sub-scan in multiple form by the number corresponding to a predetermined number of times. Since at least adjacent portions to be exposed overlap, the exposure can be made without space. For example, a failure to record or read an image is no longer produced. As described in the third aspect of the present invention, the sub-scan can also be made by conveying the photosensitive material in the direction intersecting the main scanning direction. The distance between the portion exposed to at least one of the plurality of light beams and the portion exposed to respective other light beams when respective the plurality of light beams are exposed toward an object, is determined. The determined distance corresponds to a position displacement of each of the plurality of light beams from the same portion. Thus, when the timing for starting the exposure to be effected by at least one of the main scan and sub-scan made with the respective light beams is changed according to the distance, i.e., the position displacement, the portions corresponding to the respective light beams, which are exposed to the plurality of light beams, become the same. Accordingly, the positions of the plurality of light beams can be brought into alignment depending on the positions of light beams at the time of the multiple exposure described above. Further, the resolution for adjusting variations in color at the time of recording and reading of a color image can be improved by the plurality of light beams.

According to the present invention, as has been described above, the distance between the portion exposed to at least one of the plurality of light beams and the portion exposed to respective other light beams when respective the plurality of light beams are exposed toward an object, is determined. The timing for starting the exposure to be effected by at least one of the main scan and sub-scan made with respective the plurality of light beams is changed according to the distance. Therefore, excellent advantages can be brought about in that the shadeness of color is not produced and an image whose finished state is satisfactory can be formed.

Further, the main scan for making the scans with the plurality of light beams in one direction and the sub-scan for making the scans with the light beams in the direction intersecting the direction of the main scan are made the predetermined number of times in the predetermined direction in such a manner that at least adjacent portions to be exposed overlap each other, to thereby make the two-dimensional exposure. Therefore, the resolution for detecting the distance corresponding to the position displacement of each of the plurality of light beams can be improved.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIGS. 13A and 13B are timing charts for describing the output timing of image data;

FIG. 14 is a timing chart for explaining the bank switching of a look-up table; and FIGS. 15A through 15E are timing charts for describing the correction of position displacement in a main scanning direction.

DETAILED DESCRIPTION OF THE PREFERRED EMBODIMENTS

Figure 1:
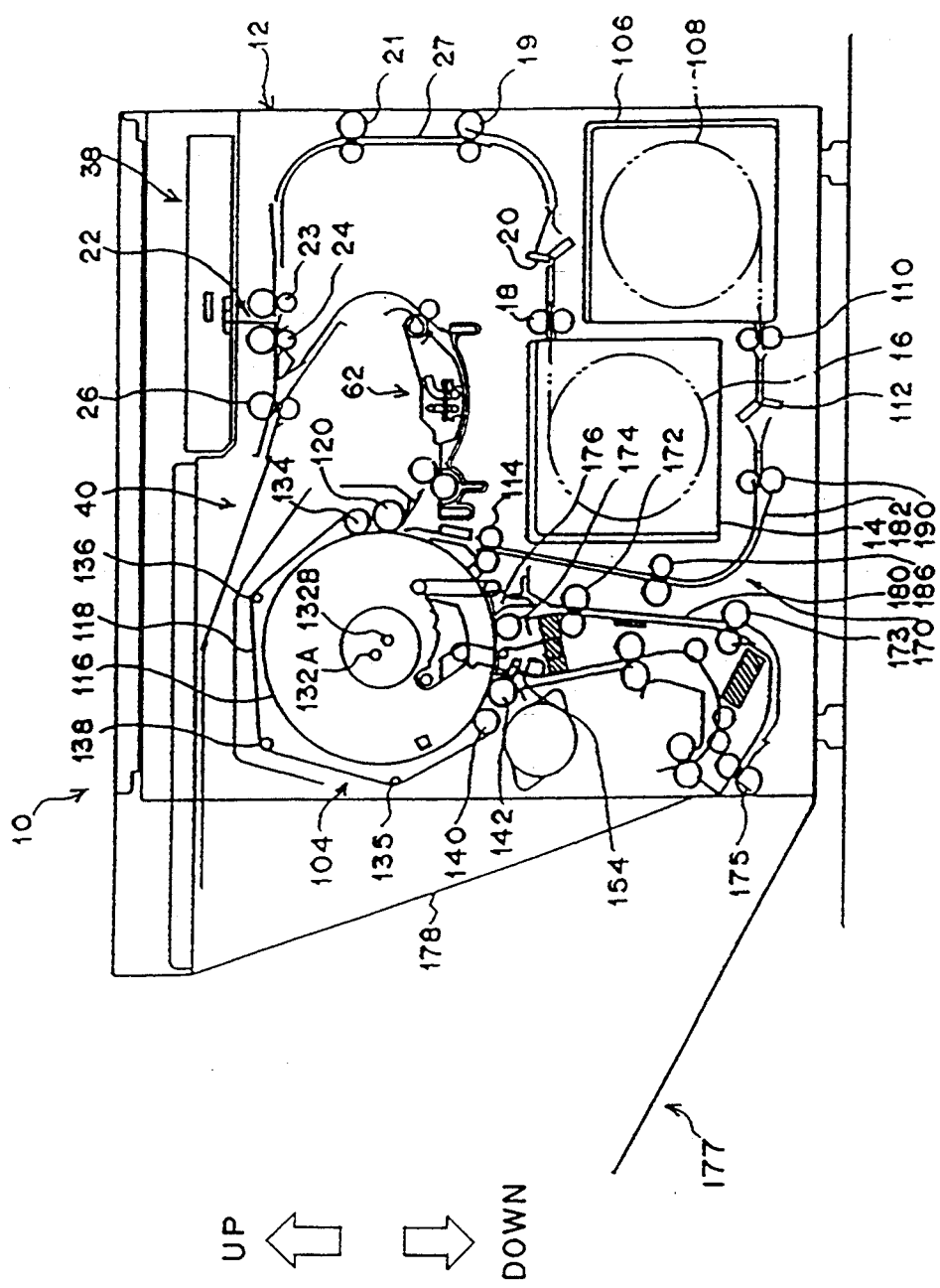
FIG. 1 is a schematic view showing the overall structure of an image recording apparatus according to one embodiment of the present invention.
Figure 2:
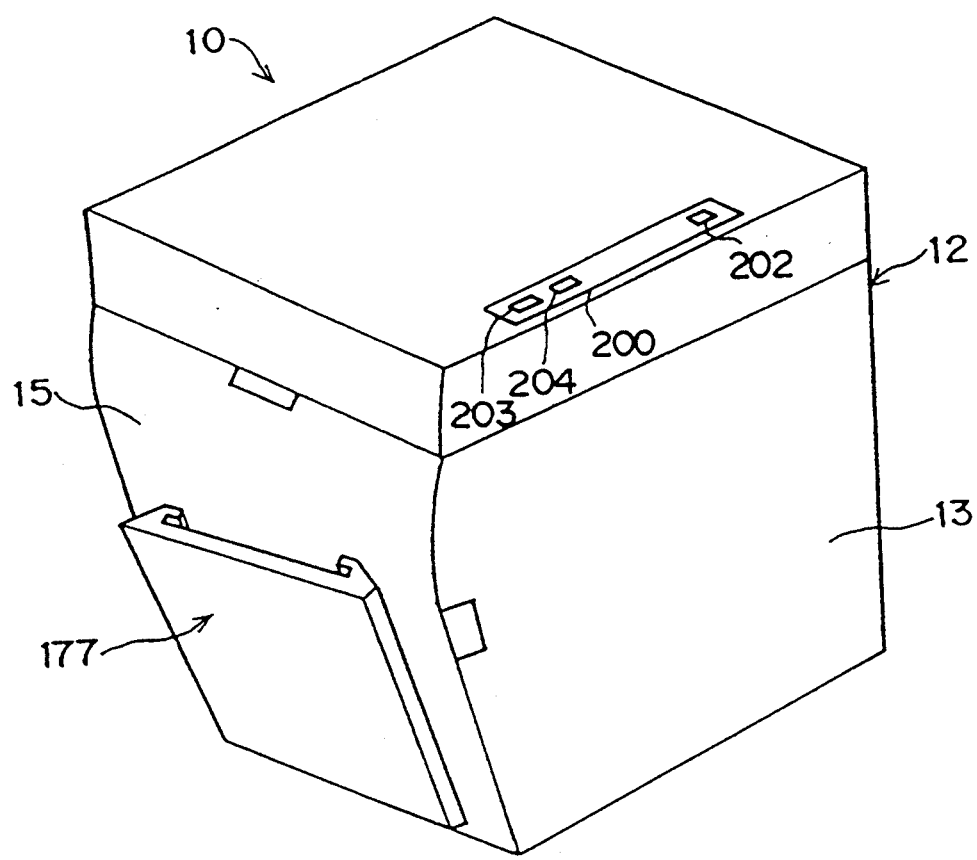
FIG. 2 is a perspective view showing the outer appearance of the image recording apparatus shown in FIG. 1.

FIG. 1 schematically shows the overall structure of an image recording apparatus 10 according to the present invention. FIG. 2 is an external view of the image recording apparatus 10.

The term "upward" direction described in the present embodiment is represented as an UP direction indicated by the arrow in FIG. 1, whereas the term "downward" direction is represented as a DOWN direction indicated by the arrow in FIG. 1. Further, the term "side" direction described in the present embodiment is represented as the direction orthogonal to the "upward and downward" directions.

As shown in FIG. 2, the image recording apparatus 10 as a whole is shaped in the form of a box. A support base 12 comprises a front door 13 and a side door 15. When each of the front and side doors 15 and 13 is opened, the inside of the support base 12 can be brought into an exposed state. A control panel 200 having a start key 202, a test key 204 and a key 203 comprising keys represented by the numbers 0 to 9 is mounted on the upper surface of the support base 12.

As shown in FIG. 1, a magazine 14 for a photosensitive medium or material 16 is disposed within the support base 12 of the image recording apparatus 10. The photosensitive material 16 is wound and accommodated within the magazine 14 in the form of a roll. The photosensitive material 16 is wound in the magazine 14 in such a manner that a photosensitive (i.e., exposure) surface thereof is in the direction of the center of a winding or take-up spindle around which the photosensitive material 16 is wound.

A pair of nip rollers 18 and a cutter 20 are disposed in the vicinity of a photosensitive-material withdrawal aperture defined in the magazine 14. After the photosensitive material 16 has been drawn out a predetermined length from magazine 14, it can be cut by the cutter 20. A plurality of pairs of conveying rollers 19, 21, 23, 24 and 26 and a guide plate 27 are disposed on the downstream side of a conveying path as seen from the cutter 20 and can convey the photosensitive material 16 which has been cut into predetermined lengths by the cutter 20 to an exposure section 22.

The exposure section 22 is provided between the pair of conveying rollers 23 and the pair of conveying rollers 24. That is, a region between these rollers is used as an exposure section (i.e., exposure point) for the photosensitive material 16 and allows the passage of the photosensitive material 16.

An exposure device 38 (see FIG. 3) is disposed just above the exposure section 22. The exposure device 38 to be described in detail later controls each semiconductor laser in response to a laser drive signal outputted from a control device or controller 206 (see FIG. 4) and main-scans with each laser beam to form a slit exposure on the photosensitive material 16.

A switchback portion 40 is provided at a side portion of the exposure section 22. Further, a water applicator 62 is disposed below the exposure section 22. The photosensitive material 16 is conveyed along the guide plate 27 by the conveying rollers 19 and 21 and is then exposed by the exposure section 22. Thereafter, the photosensitive material 16 is temporarily fed to the switchback portion 40. Then, the reverse rotation of the pair of conveying rollers 26 causes the material 16 to pass through a conveying path provided below the exposure section 22 so as to be fed to the water applicator 62. The water applicator 62 is connected to a plurality of pipes which enable the supply of water. A thermal development/transfer device 104 is provided at a side portion of the water applicator 62 and receives the photosensitive material 16 to which water has been applied.

On the other hand, an image-receiving material accommodating magazine 106 is provided at a side portion of the magazine 14 in the support base 12. Further, the magazine 106 accommodates an image receiving material 108 in the form of a roll. A dye fixing material having a mordant is applied onto an image-forming surface of the image receiving material 108. The image-forming surface thereof is wound on an unillustrated take-up spindle so as to be in the direction of the center of the take-up spindle around which the image receiving material 108 has been wound.

The magazine 106 is made up of a drum and a pair of side frames fixed to both ends of the drum. The magazine 106 can be withdrawn from the front side (i.e., on this side as seen in FIG. 1, that is, in the transverse direction of the wound image receiving material 108) of the support base 12. The magazine 14 is constructed in the same manner as the magazine 106. A pair of nip rollers 110 is disposed in the vicinity of an image-receiving material withdrawal aperture defined in the magazine 106. The nip rollers 110 can withdraw the image receiving material 108 from the magazine 106 and then release it. A cutter 112 is disposed on the downstream side of a conveying path as seen from the nip rollers 110.

An image-receiving material conveying section 170 disposed on the magazine 14 side is provided at a side portion of the cutter 112. The image-receiving material conveying section 170 comprises pairs of conveying rollers 190, 186, and 114 and a guide plate 182 and can convey the image receiving material 108 which has been cut to predetermined lengths to the thermal development/transfer device 104.

The photosensitive material 16 fed into the thermal development/transfer device 104 is conveyed between a lamination roller 120 and a heating drum 116. Further, the image receiving material 108 is conveyed between the lamination roller 120 and the heating drum 116 in synchronism with the conveyance of the photosensitive material 16. At this time, the photosensitive material 16 is fed between the lamination roller 120 and the heating drum 116 in advance of the image receiving material 108 by a predetermined length. Thereafter, the photosensitive material 16 and the image receiving material 108 are superimposed onto each other. A pair of halogen lamps 132A and 132B is disposed within the heating drum 116 so that the temperature of the surface of the heating drum 116 can be raised.

An endless pressure belt 118 is wound on five winding rollers 134, 135, 136, 138 and 140. The outer peripheral surface of the endless pressure belt 118 wound between the winding roller 134 and the winding roller 140 is brought into pressing contact with the outer periphery of the heating drum 116.

A flexible guide roller 142 is provided at the lower part of the heating drum 116, which is located on the downstream side of the endless pressure belt 118 as seen in the conveying direction of the photosensitive material 16. A separator 154 is rotatably supported by a shaft on the downstream side of the flexible guide roller 142 as seen in the conveying direction of the photosensitive material 16 and at the lower part of the heating drum 116. The photosensitive material 16, which has been separated from the heating drum 116 by the separator 154, is wound on the flexible guide roller 142 and collectively loaded into a photosensitive-material waste receiver 178.

A separation roller 174 and a separator 176 are disposed at a side portion of the flexible guide roller 142 and in the vicinity of the heating drum 116. An image-receiving material guide 180 is disposed below the separation roller 174 and the separator 176. Similarly, respective pairs of image-receiving material discharge rollers 172, 173 and 175 are disposed therebelow. The image-receiving material guide 180 and the pairs of image-receiving material discharge rollers 172, 173 and 175 can guide and convey the image receiving material 108 which has been separated by the separation roller 174 and the separator 176. The image receiving material 108 separated from the outer periphery of the heating drum 116 by the separator 176, is conveyed by the image-receiving material guide 170 and the pairs of image-receiving material discharge rollers 172, 173 and 175 so as to be discharged into a tray 177.

Figure 3:
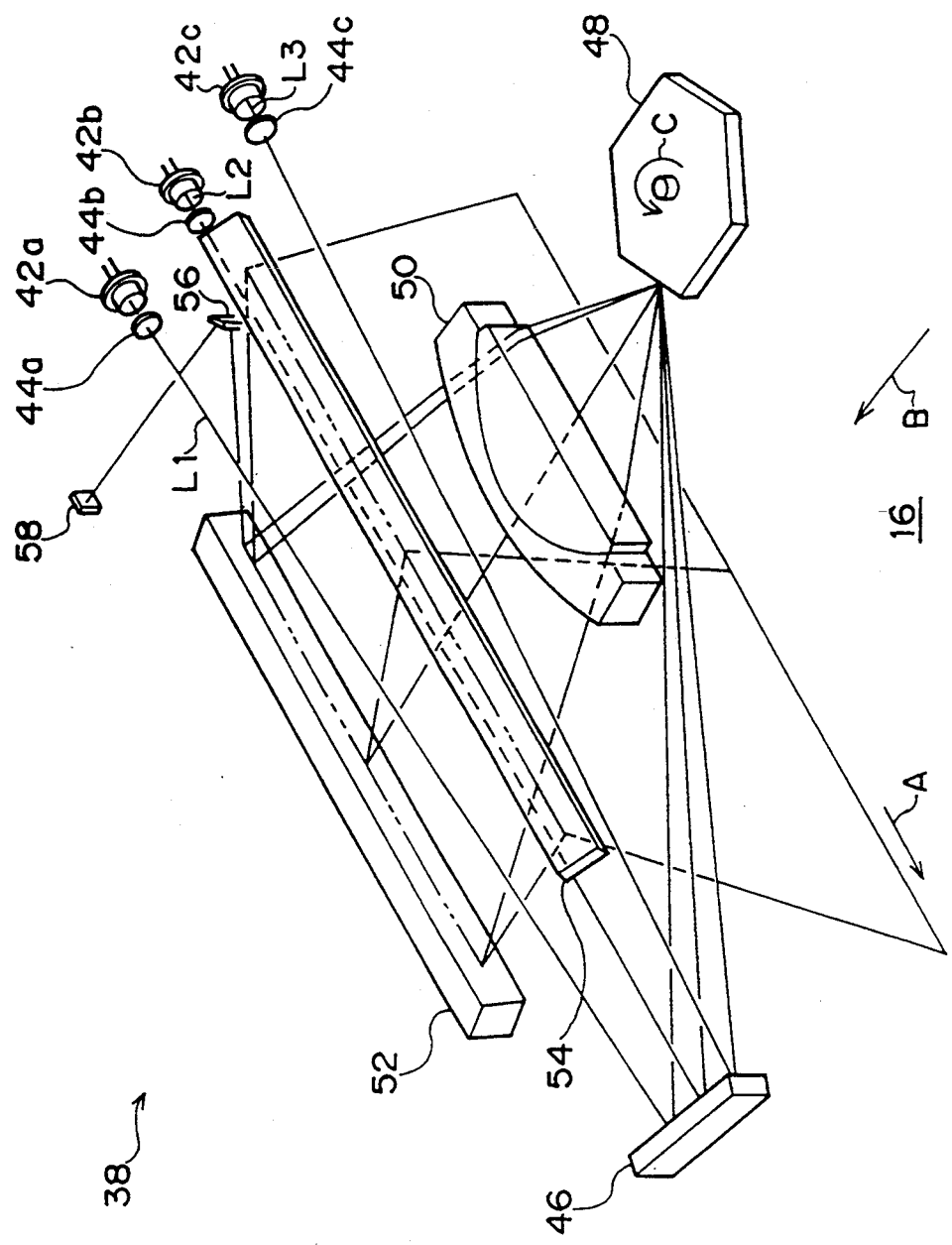
FIG. 3 is a perspective view schematically illustrating the structure of an exposure device.

As shown in FIG. 3, the exposure device 38 has semiconductor lasers 42a, 42b and 42c. Each of the semiconductor lasers 42a, 42b and 42c is driven by the controller 206 (see FIG. 4) to be described later. The semiconductor laser 42a emits a laser beam L1 having a 750 nm infrared wavelength region, for example. The semiconductor lasers 42b and 42c respectively emit laser beams L2 and L3 having wavelengths of 670 nm and 810 nm. The wavelengths of the laser beams L1, L2 and L3 respectively correspond to respective colors of cyan, magenta and yellow, which are color-developed by the exposure of the photosensitive material 16.

A lens group 44a made up of a collimator lens for focusing or concentrating the laser beam L1 substantially in parallel as a bundle and a cylindrical lens for forming the emitted beam substantially in the form of a circle and the like, is disposed on the laser-beam emission side of the semiconductor laser 42a. Similarly, each of lens groups 44b and 44c is disposed on the laser-beam emission side of each of the semiconductor lasers 42b and 42c. A reflecting mirror 46 is provided on the projection side of the lens groups 44a, 44b and 44e.

The laser beams L1, L2 and L3 reflected by the reflecting mirror 46 enter into a polygon mirror 48. The polygon mirror 48 rapidly rotates in the direction indicated by the arrow C. The laser beams L1, L2 and L3 reflected by the polygon mirror 48 pass through a fθ lens 50. Thereafter, the laser beams L1, L2 and L3 are successively reflected by cylindrical mirrors 52 and 54 each having a function for correcting undesired face refraction of the fθ lens. The photosensitive material 16 is then main-scanned in the direction indicated by the arrow A. Thus, the laser beams conveyed for main scanning by the polygon mirror 48 enter into the exposure section 22 (see FIG. 1) as slit light. When the photosensitive material 16 is driven by the rotation of the pairs of conveying rollers 23 and 24 (see FIG. 1), it is conveyed in the direction (i.e., in the direction indicated by the arrow B) substantially orthogonal to the main scanning direction (i.e., the direction indicated by the arrow A). As a result, an image is formed on the photosensitive material 16 (see FIG. 9). The conveying direction of the photosensitive material 16 is opposite to a sub-scanning direction.

Figure 10:
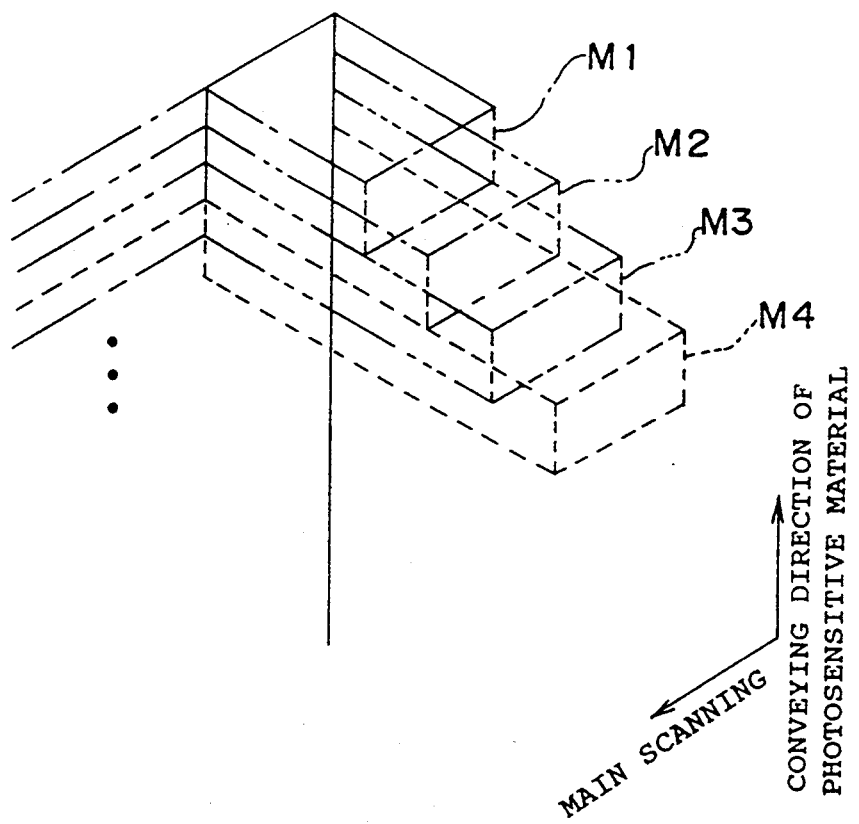
FIG. 10 is an image view illustrating the manner in which a photosensitive material is main-scanned with superimposed laser beams and conveyed in a conveying direction.

Thus, the scanning of each laser beam under the rotation of the polygon mirror 48 serves as a main scan for forming a two-dimensional image, whereas the conveying action of the photosensitive material 16 by the conveying rollers 23 and 24 serves as a sub-scan. The main scan in the present embodiment is made as follows. The laser beams for forming the image on the photosensitive material 16 are caused to scan a plurality of times (four times in the present embodiment), within a band-like region of the photosensitive material 16 fed during one scan as carried out in prior art, in such a manner that ends of the laser beams orthogonal to the scanning direction of the laser beams overlap each other. Described specifically, as shown in FIG. 10, an end of a laser beam M1 at a first scan, which is made during one main scan, is superimposed on an end of a laser beams M2 at a second scan. The laser beam M2 at the second scan and a laser beam M3 at a third scan superimposed each other at their ends. The laser beam M3 at the third scan and a laser beam M4 at a fourth scan superimposed each other at their ends. The laser beam M4 at the fourth scan and the laser beam at the next first main scan superimposed each other at their ends. The sum of exposures or exposure values by the laser beams M1, M2, M3 and M4 is controlled for each image data so as to substantially coincide with an exposure value for exposing the same portion during the conventional one main scan (this will be described in detail later).

In the present embodiment as described above, the conventional one main-scanning region is scanned so as to be overwritten in four divisions based on the same image data within one main scan. Thus, the scan divided into four will hereinafter be called "line scan" to distinguish it from the present scan and the conventional main scan. Accordingly, an image formed by 512 scanning lines during the main scan, for example, in the present embodiment, is formed by 2048 scanning lines or four times the 512 scanning lines.

Optical paths of the laser beams L1, L2 and L3 respectively emitted from the lens groups 44a, 44b and 44c are formed at acute angles to the normal line of the reflecting mirror 46 so that the respective laser beams approach each other as they approach the reflecting mirror 46. Further, a substantially identical portion on the reflecting surface of the polygon mirror 48 is irradiated with the laser beams L1, L2 and L3 which fall on the polygon mirror 48. Moreover, the laser beams L1, L2 and L3 are radiated at predetermined intervals on a straight line substantially identical to the main scanning direction on the reflecting surface of the polygon mirror 48.

Figure 9:
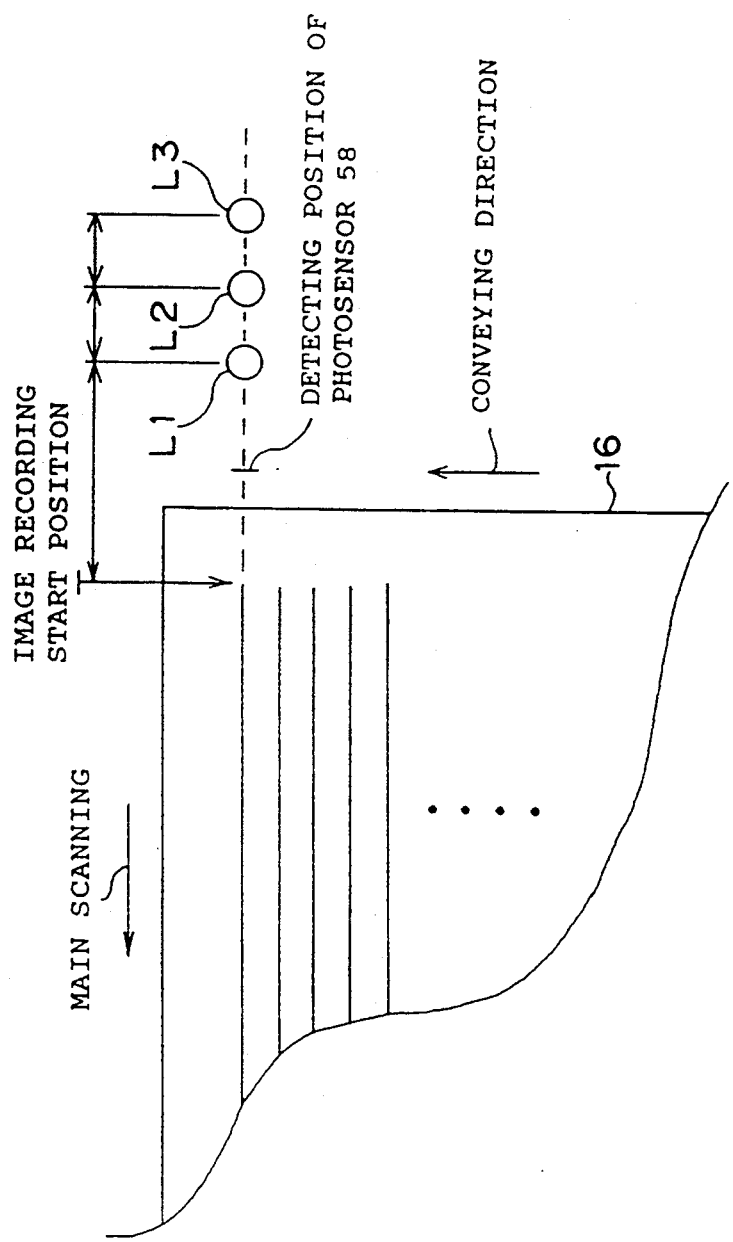
FIG. 9 is an image view showing the state of exposure of a photosensitive material by laser beams, which is main-scanned with the same beams and conveyed in a conveying direction.

Thus, when the semiconductor lasers 42a, 42b and 43b are simultaneously turned on, the laser beams L1, L2 and L3, which fall on the photosensitive material 16, are brought to their corresponding irradiation positions spaced at predetermined intervals (intervals of 13.3 mm in the present embodiment) from each other along the main scanning direction (see FIG. 9).

A reflecting mirror 56 is provided on the opposite side of the cylindrical mirror 52 and at position where the laser beam at an end (i.e., one end extending in the direction opposite to the direction indicated by the arrow A) extending in the direction of the main scan by the polygon mirror 48 is made incident. A photosensor 58 is provided on the opposite side of the reflecting mirror 56. A sensor such as a photodiode, a CCD sensor or the like is used as the photosensor 58. A signal (i.e., an SOS signal) outputted from the photosensor 58 is used to determine the timing for carrying out the main scan (line scan in detail) and the conveyance (i.e., the sub-scan) of the photosensitive material 16.

Figure 4:
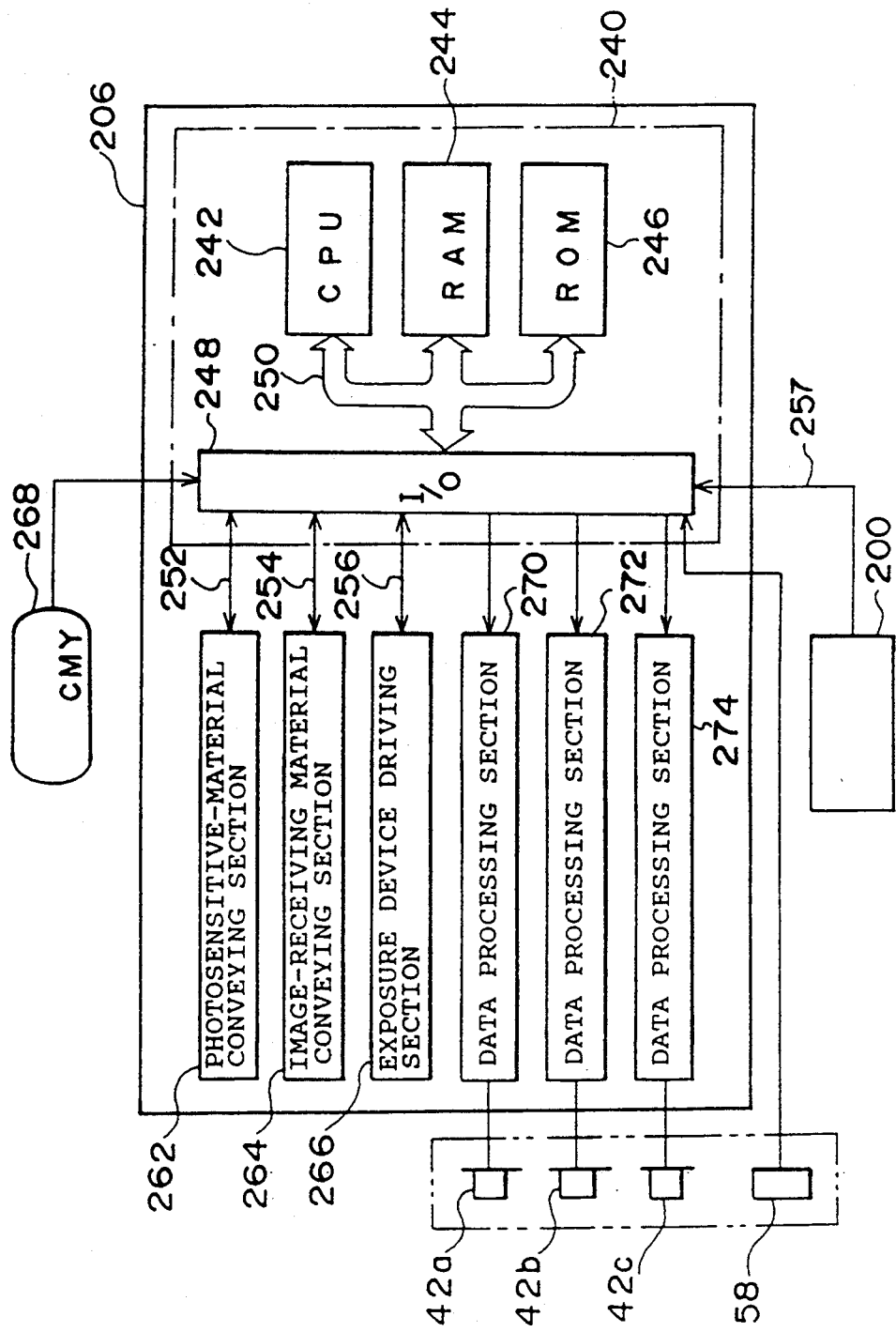
FIG. 4 is a block diagram of a controller.

As shown in FIG. 4, the controller 206 includes a microcomputer 240, which comprises a CPU 242, a RAM 244, a ROM 246, an input/output port 248 and a bus 250 for connecting these to one another, which includes a data bus, a control bus or the like.

A control program for the image recording apparatus 10 and image data capable of forming a test pattern as an image are stored in the ROM 246 of the controller 206 in advance. Positional displacements of the laser beams emitted from the semiconductor lasers 42a, 42b and 42c in the respective directions for main scanning and sub scanning both of which are carried out on the photosensitive material 16 by the laser beams can be visually confirmed by an operator.

The input/output port 248 is electrically connected to signal conductors 252 and 254 respectively extending to a photosensitive-material conveying section 262 and an image-receiving material conveying section 264. The input/output port 248 controls the driving of each conveying section and effects the control of the delivery of the photosensitive material 16 and the image receiving material 108 in response to signals outputted from sensors attached to respective parts of the controller 206. The input/output port 248 is also electrically connected to a signal conductor 256 extending to an exposure device driving section 266 for controlling the rotation of the polygon mirror 48 of the exposure device 38 shown in FIG. 3 and the like. Further, the input/output port 248 is electrically connected to the photosensor 58 so as to drive and control the polygon mirror 48 and the like.

The input/output port 248 is electrically connected to a frame memory 268 in which image data for cyan record, image data for magenta record and image data for yellow record all of which are related to images recorded by the image recording apparatus 10, have been respectively stored in a separate manner. Incidentally, these image data may be inputted from an image data output device such as a host computer or the like, which has been connected to the input/output port 248. Further, data may be used which are inputted from an image reading apparatus such as a scanner or the like.

Further, the input/output port 248 is electrically connected to a signal conductor 257 extending from the control panel 200 and receives signals inputted through the start key 202, the test key 204 and the set of ten keys 203.

Moreover, the input/output port 248 is electrically connected to the semiconductor laser 42a through a data processing section 270 for cyan, which is used for converting the input image data into a drive signal for the semiconductor laser 42a. Similarly, the input/output port 248 is electrically connected to the semiconductor laser 42b via a data processing section 272 for magenta and also to the semiconductor laser 42c via a data processing section 74 for yellow.

The data processing sections 270, 272 and 274 will now be described with reference to a block diagram shown in FIG. 5. Incidentally, the data processing sections 270, 272 and 274 are identical in structure. An individual description will therefore be omitted. The data processing section 272 for magenta will be described below by way of example.

Figure 5:
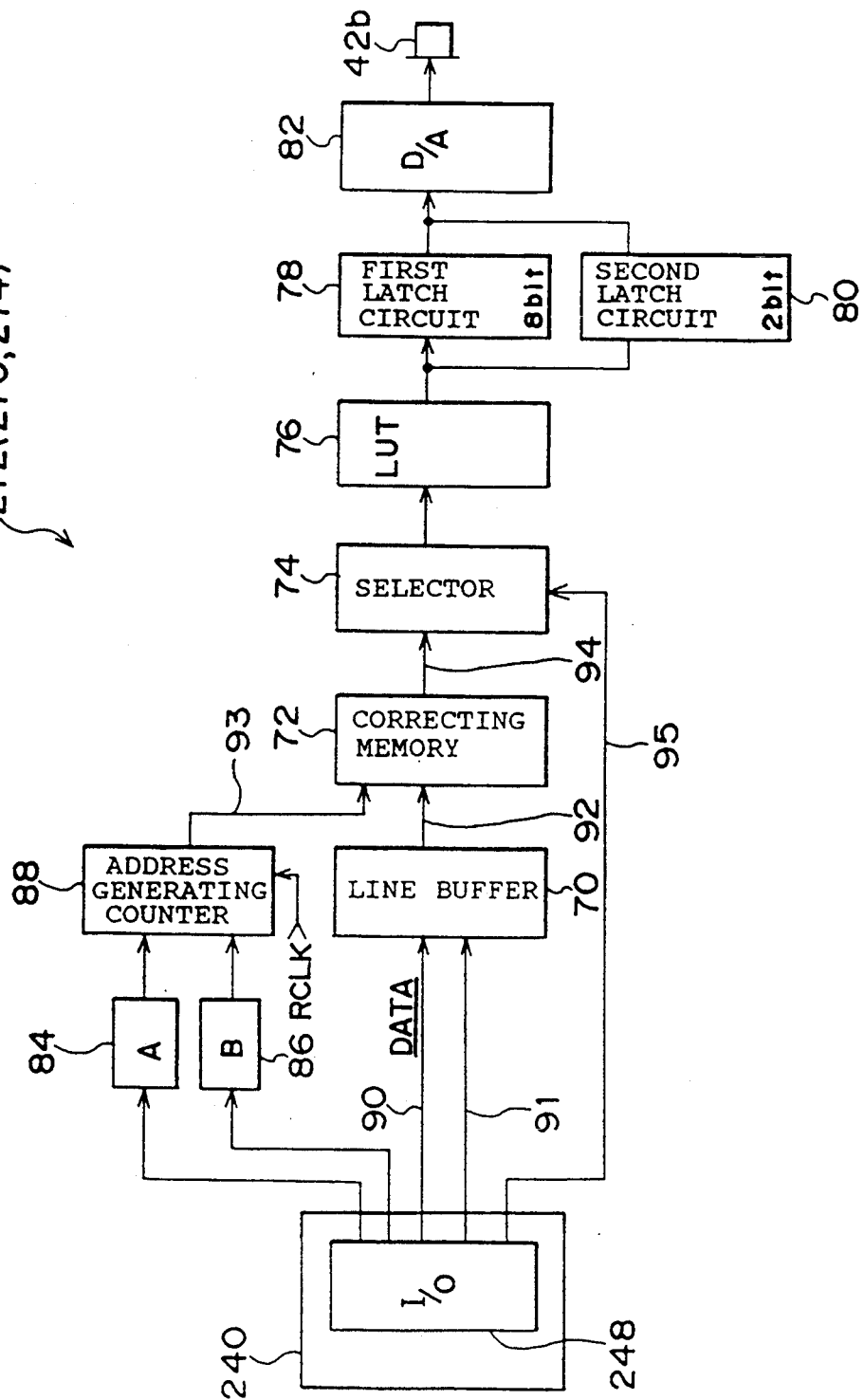
FIG. 5 is a block diagram schematically illustrating the structure of a data processing section.

As illustrated in FIG. 5, the data processing section 272 has a line buffer 70, which is electrically connected to the input/output port 248 via signal conductors 90 and 91. The line buffer 70 temporarily stores therein image data corresponding to one main scan inputted via the signal conductor 90 and successively outputs image data to a correcting memory 72 to be described later via the signal conductor 92 in response to an instruction signal inputted via the signal conductor 91.

Since one main scan performed by a conventional image recording apparatus is effected in the present embodiment by being divided into four line scans, the instruction signal outputted from the input/output port 248 via the signal conductor 91 is outputted four times. Thus, image data stored in the line buffer 70, which is identical to the image data corresponding to the one main scan, is outputted four times.

Figure 12A:
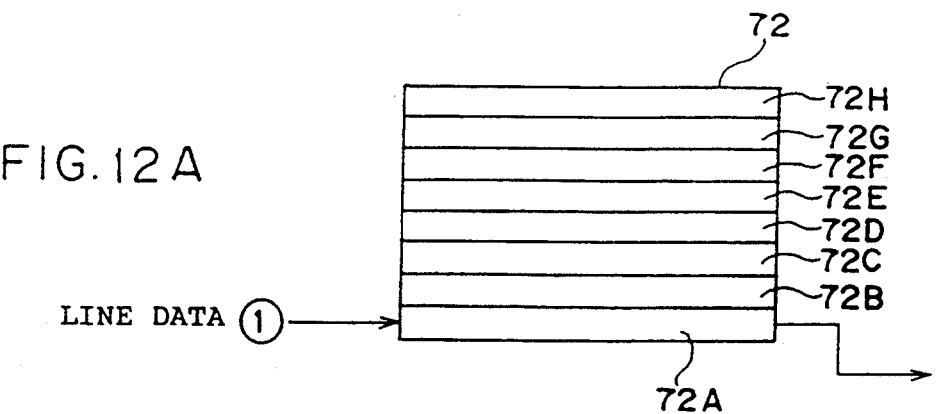
FIGS. 12A through 12C are image views for explaining the operation of a correcting memory.

The correcting memory 72 is made up of a storage element such as an SRAM or the like. The correcting memory 72 can store the input image data corresponding to one line scan in plural form (image data corresponding to eight lines in the present embodiment). Therefore, the correcting memory 72 can virtually designate or specify each of a first line recording region 72A, a second line recording region 72B, a third line recording region 72C, a fourth line recording region 72D, a fifth line recording region 72E, a sixth line recording region 72F, a seventh line recording region 72G and an eighth line recording region 72H as a storage region for each line scanning in response to an address (see FIG. 12A).

The correcting memory 72 is electrically connected via a signal conductor 93 with an address generating counter 88 for specifying an address at the time of input and output of image data to and from the correcting memory 72. The output of the correcting memory 72 is electrically connected to a selector 74 via a signal conductor 94.

Further, the correcting memory 72 is activated in a read-modify write mode. The read-modify write mode represents a mode for successively reading and storing data under the same address. The correcting memory 72 outputs the image data stored therein through the signal conductor 94 in response to the specified address sent through the signal conductor 93. Further, the correcting memory 72 stores the image data inputted through the signal conductor 92. Thus, the correcting memory 72 can read the image data therefrom and store it in accordance with the same address.

Incidentally, the correcting memory 72 may be comprised of a plurality of line memories. The correcting memory 72 is not necessarily limited to or by the operation under the read-modify write mode. The correcting memory 72 may be constructed in such a way as to successively store therein image data from the line buffer 70, corresponding to one line scan and selectively output any one of the stored image data corresponding to the one line scan.

In the address generating counter 88, a counter, which counts up for each read clock (RCLK) equivalent to a pixel clock corresponding to one pixel reading or writing cycle, is activated to generate an address. The address generating counter 88 is electrically connected to the input/output port 248 via a counter enable generating circuit 84 (see FIG. 7) for generating a ready signal (so-called enable signal) used for the address generating counter 88 and a counter reset circuit 86 (see FIG. 8) for generating a reset signal for bringing the address of the address generating counter 88 into an initial state (i.e., address 0).

The output of the selector 74 inputted with the image data from the correcting memory 72 is electrically connected to a look-up table (hereinafter called "LUT") to be described later. The selector 74 is electrically connected to the input/output port 248 through a signal conductor 95 in such a way as to be supplied with a selection signal for outputting either one of the image data inputted through the signal conductor 94 and a bank switching signal for the LUT 76 to be described later.

The LUT 76 is made up of a storage element such as an SRAM or the like. Density data indicative of the density of an image with respect to the image data and drive data indicative of a drive value for the semiconductor laser 42b are stored in the LUT 76 as a corresponding table in advance. The input image data is specified on the LUT 76 as a 8-bit address and outputted as 10-bit drive data for the semiconductor laser 42b, which has been stored in association with the 8-bit address.

Figure 6:
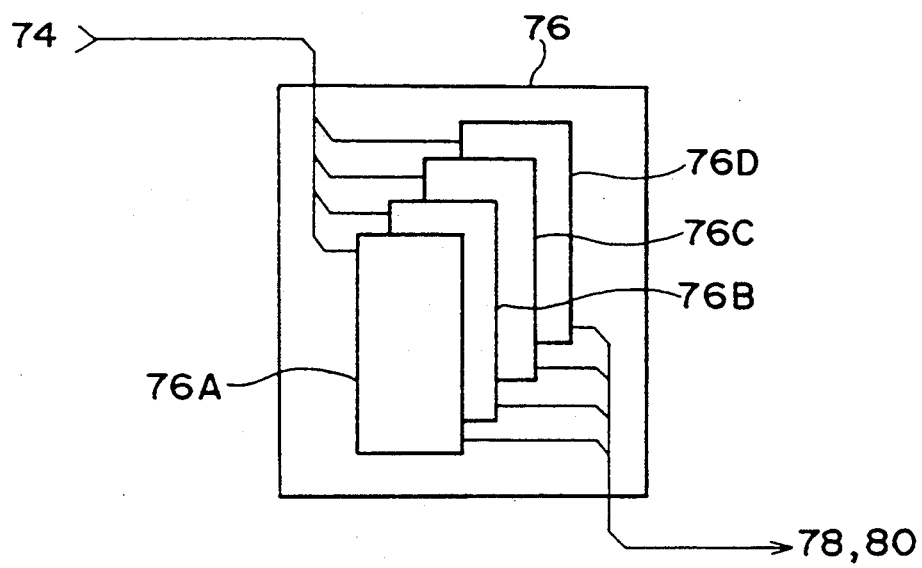
FIG. 6 is an image view for explaining an internal structure of a look-up table.

In the present embodiment as described above, the four line scans are made with respect to the conventional one main scan. Therefore, the LUT 76 comprises parallel-connected four LUT banks 76A, 76B, 76C and 76D, which are related to each other for each image data and which correspond to each other upon each line scanning and are operated separately from each other (see FIG. 6). The image data and the drive data are set on each of the LUT banks 76A, 76B, 76C and 76D in such a manner that the sum of exposures or exposure values produced by the laser beams in accordance with the respective drive data (10 bits) outputted based on one image data coincides substantially with an exposure value produced by conventionally-used 12-bit drive data.

Thus, the LUT 76 selects any one of the LUT banks 76A, 76B, 76C and 76D for each image data, i.e., under the same address and in response to the bank switching signal inputted from the microcomputer 240 via the signal conductor 95 and the selector 74 and outputs one drive data therefrom.

The mutual relationship between the LUT banks 76A, 76B, 76C and 76D can be defined in accordance with the following method. Values obtained by simply dividing the conventional-used 12-bit drive data capable of providing a print whose finished state is satisfactory by 4 are stored and recorded superposedly in the respective LUT banks 76A through 76D. A decision is then made as to the state of density of each value either visually or by a detector. Further, the drive data of the LUT banks 76A through 76D with respect to a large amount of image data are fine-adjusted and set until a satisfactory print can be obtained. The finally-adjusted drive data is determined as the drive data most suitable for the LUT banks 76A through 76D.

The output of the LUT 76 is electrically connected to a digital input of a ten-bit input type digital-analog converter 82 via a first latch circuit 78 and a second latch circuit 80.

The first latch circuit 78 divides 10-bit drive data outputted from the LUT 76 into 8-bit data and latches it therein, whereas the second latch circuit 80 divides the 10-bit drive data into 2-bit data and latches it therein. It is unnecessary to separately provide the first and second latch circuits 76 and 80. Alternatively, a 10-bit latch circuit may be provided. The outputs of the first and second latch circuits 78 and 80 are electrically connected to the digital input of the digital-analog converter 82 in a 10-bit configuration. The digital-analog converter 82 is supplied with the 10-bit drive data.

An analog output of the digital-analog converter 82 is electrically connected to the semiconductor laser 42b. A signal converted into an analog value in accordance with the 10-bit data in total latched in the first and second latch circuits 78 and 80 is inputted to the semiconductor laser 42b.

Figure 7:
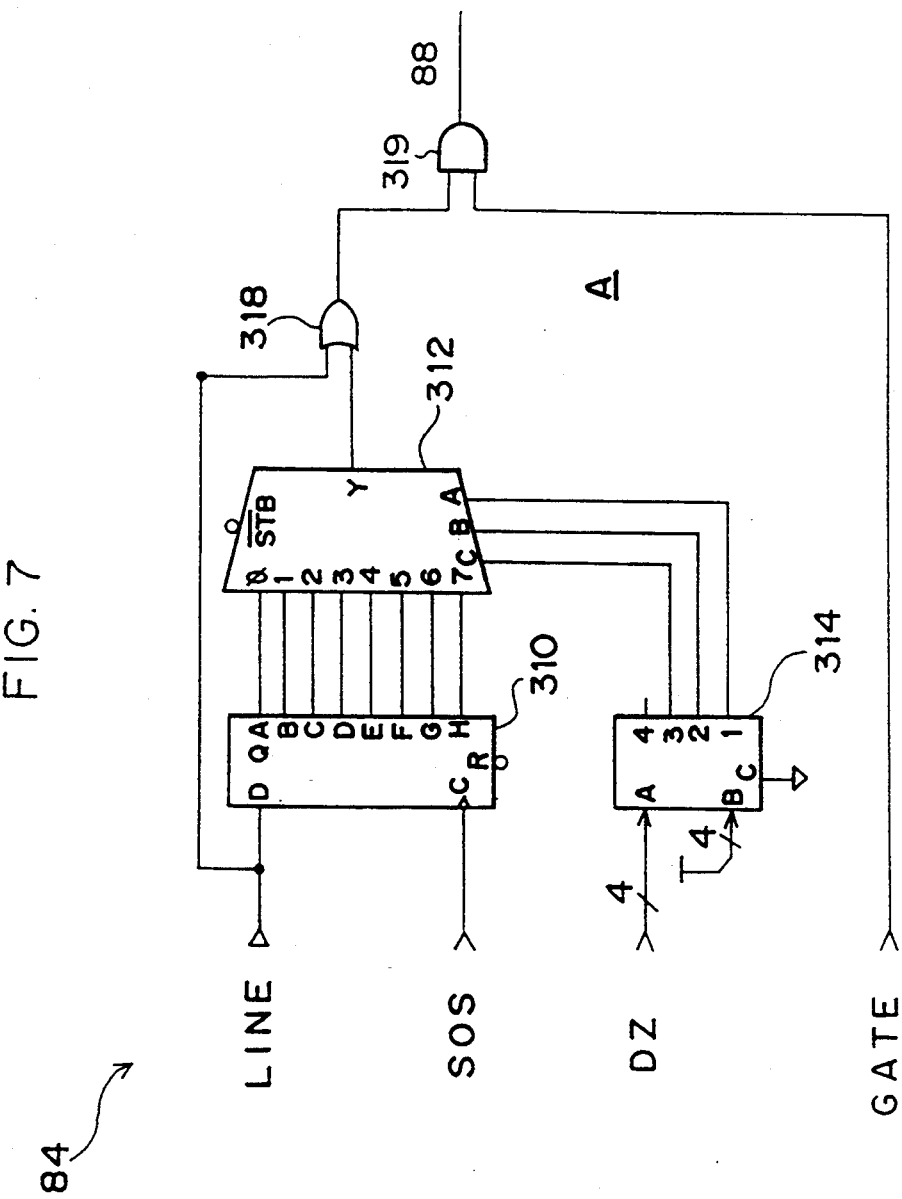
FIG. 7 is a circuit diagram showing one example of a counter enable generating circuit.

FIG. 7 shows one example of the counter enable generating circuit 84.

The counter enable generating circuit 84 has a shift register 310 and a selector 312. The shift register 310 is supplied with a line signal (i.e., LINE signal) which is brought to a high level during an all line scanning time interval. The shift register 310 delays the input signal time intervals corresponding to 1 to 8 line scans and outputs them to the selector 312.

Control terminals (i.e., points A, B and C of the selector 312 in FIG. 7) of the selector 312 are electrically connected to the output of an adder 314. The adder 314 is electrically connected to a setting register 340 (see FIG. 8) and inputted as 4-bit data with the number of lines scanned by each laser beam, which have been displaced or deviated in the conveying direction of the photosensitive material 16. The selector 312 outputs a signal delayed in accordance with setting data outputted from the adder 314.

For example, when there is no displacement as discussed above, the signal outputted from the selector 312 is always low at level. When the number of the deviated lines is set to two, the selector 312 outputs a LINE signal obtained by making a time delay corresponding to a two line scanning time interval with respect to a time interval required to maintain the above LINE signal at the high level. Thus, when the number of the deviated lines is set to the two, a signal outputted from an OR circuit 318 corresponds to the sum of the LINE signal inputted to the shifter register 310 and the signal outputted from the selector 312. That is, the signal whose time interval is long by the two line scanning time interval is outputted as compared with the case where there is normally no deviation. This signal is inputted to an AND circuit 319 together with a gate signal (GATE) brought to a high level by an image recording time interval during one line scanning time.

Thus, the counter enable generating circuit 84 outputs enable signals in large numbers by the set number of times corresponding to the number of the deviated lines as compared with the case where there is no deviation.

Figure 8:
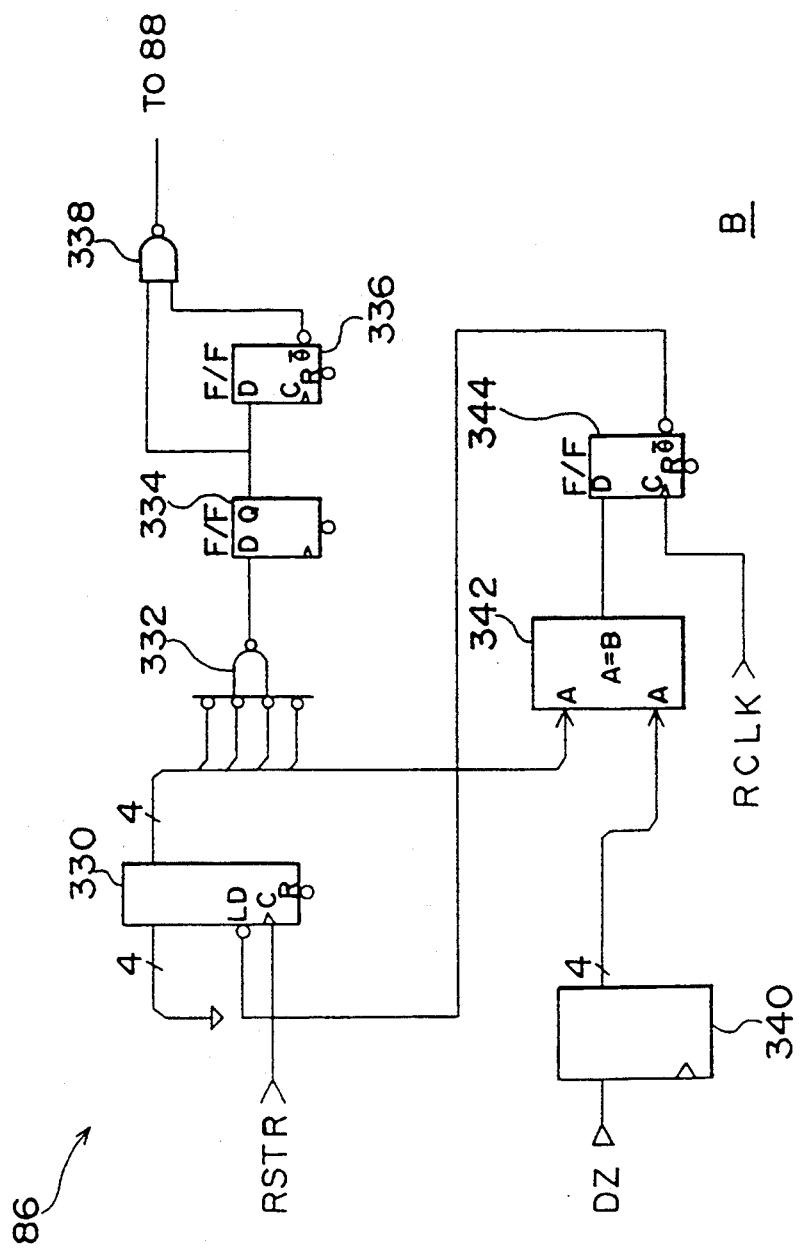
FIG. 8 is a circuit diagram illustrating one example of a counter reset circuit.

FIG. 8 shows one example of the counter reset circuit 86.

The counter reset circuit 86 has a counter 330. The counter 330 serves as a counter for counting up in response to a pulse signal (i.e., RSTR signal) brought to a high level during a predetermined time interval for each line scanning. The output of the counter 330 is electrically connected in parallel with the input of an OR circuit 332. Thus, the OR circuit 332 outputs a low-level signal only when the counter 330 is reset. The output of the OR circuit 332 is electrically connected to one of the inputs of a NAND circuit 338 via flip-flop circuits 334 and 336. The other of the inputs of the NAND circuit 338 is electrically connected to the output of the flip-flop circuit 334. Incidentally, each of the flip-flop circuits 334 and 336 is inputted with an unillustrated clock signal. This clock signal is shifted by a half clock in phase in such a manner that the flip-flop circuit 336 is operated with a given time delayed with respect to the flip-flop circuit 334.

Further, the output of the counter 330 is electrically connected to one of the inputs of a comparator 342. The other input of the comparator 342 is electrically connected to the setting register 340. The setting register 340 stores as data a signal (i.e., DZ signal) corresponding to the number of lines deviated in the photosensitive-material conveying direction and set by the set of ten keys 203 on the control panel 200, which are scanned by each laser beam. The output of the comparator 342 is electrically connected to the counter 330 via the flip-flop 344.

Thus, the counter 330 starts to count up. When the input signals of the comparator 342 coincide with each other, that is, a count coincident with the number of the deviated lines is reached, a signal outputted from the comparator 342 is brought to a high level. In response to the signal outputted from the comparator 342, the flip-flop circuit 344 outputs a signal which is synchronized with a read clock (RCLK) equivalent to one pixel clock and which is brought to a low level only during the period of a time width for one line scan, to the counter 330, with the result that the counter 330 is reset. The flip-flop circuits 334 and 336 are activated based on a high-level signal outputted from the OR circuit 332. Since, however, the timing of the clock signal inputted to the flip-flop circuit 336 is delayed in time with respect to the timing of the clock signal inputted to the flip-flop circuit 334, high-level signals are brought about in both flip-flop circuits 334 and 336 during the period of from the operation of the flip-flop circuit 334 to the input of the clock signal to the flip-flop circuit 336. Thus, the NAND circuit 338 outputs a low-level signal for each deviated line number set to the setting register 340 so as to reset the address generating counter 88.

The operation of the present embodiment will now be described.

When the start key 202 is first operated, an image recording process is started. The image recording process is executed in accordance with the following procedures.

With the magazine 14 set, the pair of nip rollers 18 is operated so as to draw out the photosensitive material 16 from the magazine 14. The photosensitive material 16, which has been pulled out by a predetermined length, is cut thereat by the cutter 20. Next, the photosensitive material 16 is conveyed along the guide plate 27 and reversed in such a way as to be brought into a state in which the photosensitive (exposure) surface thereof is turned upward. Thereafter, the photosensitive material 16 is conveyed to the exposure section 22.

The exposure device 38 is activated simultaneously with the conveying of the photosensitive material 16 to thereby scan with the laser beam based on the image data in the exposure section 22. The exposure amount of the laser beams are set according to the respective drive data for the three semiconductor lasers, which are respectively outputted from the data processing section to be described later. The photosensitive material 16 positioned at the exposure section 22 is scanned and exposed by the laser beams.

After the above exposure has commenced, the exposed photosensitive material 16 is first fed into the switchback portion 40 and then introduced into the water applicator 62 by the reverse rotation of the pair of conveying rollers 26. The water applicator 62 applies water to the photosensitive material 16 and removes excess water therefrom. Next, the photosensitive material 16 to which the water serving as an image forming solvent has been applied by the water applicator 62, is conveyed to the thermal development/transfer device 104.

When, on the other hand, the scanning and exposure of the photosensitive material 16 are started, the image receiving material 108 is also withdrawn from the magazine 106 by the pair of nip rollers 110 and conveyed by the nip rollers 110. The image receiving material 108, which has been drawn out to a given length from the magazine 106, is cut by the cutter 112. Thereafter, the image receiving material 108 is conveyed by the pairs of conveying rollers 190, 186 and 114 in that order while being guided by the guide plate 182 and brought into a waiting state immediately before the thermal development/transfer device 104.

The following operation is made in the thermal development/transfer device 104. That is, when the photosensitive material 16 is conveyed between the outer periphery of the heating drum 116 and the lamination roller 120, the delivery of the image receiving material 16 is resumed. As a result, the image receiving material 108 is conveyed to the lamination roller 120 and the heating drum 116 is activated. The photosensitive material 16 and the image receiving material 108, which have been superimposed on each other by the lamination roller 120, are heated by the heating drum 116. Thus, movable dyes are discharged from the photosensitive material 16 and at the same time transferred onto a dye fixing layer of the image receiving material 108 thereby producing an image.

When the photosensitive material 16 and the image receiving material 108 are then held and conveyed so as to reach the lower part of the heating drum 116, the separator 154 is moved and brought into engagement with the leading end of the photosensitive material 16 conveyed in advance of the image receiving material 108 by a predetermined length, thereby separating the leading end of the photosensitive material 16 from the outer periphery of the heating drum 116. Further, the separator 154 is reset and moved. Thus, the photosensitive material 16 is wound on the flexible guide roller 142 and moved downward so as to be collectively loaded into the photosensitive-material waste receiver 178.

On the other hand, the image receiving material 108, which is separated from the photosensitive material 16 and moved so as to be tightly stuck onto the heating drum 116, is separated from the outer periphery of the heating drum 116 by the separator 176. Further, the image receiving material 108 is moved downward while being wound on the separation roller 174. Thereafter, the image receiving material 108 is conveyed by the pairs of image-receiving material discharge rollers 172, 173 and 175 while being guided by the image-receiving material guide 180 so as to be discharged into the tray 177.

When the test key 204 is now depressed, the image recording apparatus 10 is brought to a test mode and outputs a test pattern. An operator visually identifies the outputted test pattern to measure position displacement of each laser beam. The measured position displacement is inputted to the controller 206 by depressing the set of ten keys 203 and stored in the setting register 340 as data.

A description will first be made of the case where a laser beam emitted from each semiconductor laser creates an exposure on the photosensitive material 16 without its position displacement, inclusive of the formation of an image on the photosensitive material 16 based on the image data and the operation of each data processing section. The data processing sections 270, 272 and 274 are identical in structure. The data processing section 272 for magenta will therefore be described.

In the present embodiment as described above, the image data corresponding to one main scan is read four times. In order to avoid the confusion of the image data read four times, corresponding to the one main scan, a plurality of image data corresponding to one main scan will be described as line data 1, line data 2, line data 3, and line data 4 according to the number of times in which the image data is read.

Image data corresponding to one main scan read from the frame memory 268 are successively stored in the line buffer 70. The image data is outputted from the line buffer 70 in order of main scanning for each pixel. The correcting memory 72 is not operated (so-called accessed) upon reading the pixels.

Since the one main scan is made by being divided into four line scans, the line buffer 70 is instructed to output the image data again. Thus, the stored image data corresponding to the one main scan is outputted as the line data 2 in the same manner as described above.

The LUT 76 outputs 10-bit drive data corresponding to one line scan based on the image data outputted from the correcting memory 72. Then, the digital-analog converter 82 successively converts the input drive data into analog values. Thus, the semiconductor laser 42b is successively controlled based on the amount of exposure corresponding to the image data equivalent to the one line scan.

Similarly, the line buffer 70 is instructed to output the line data 3. In the same manner as described above, the semiconductor laser 42b is successively controlled based on the exposure values corresponding to the respective image data in the line data 2. Similarly, the line buffer 70 is instructed to output the line data 4. In the same manner as described above, the semiconductor laser 42b is successively controlled based on the exposure values corresponding to the respective image data in the line data 3.

When the output of the image data from the line buffer 70, corresponding to the one line scan divided into four is completed, image data corresponding to the next one main scan is stored in the line buffer 70 in order.

By repeating the above processing corresponding to all the main scans, i.e., one screen, a two-dimensional magenta image can be formed on the photosensitive material 16. Thus, the data processing sections 270 and 274 can also process image data in a manner similar to the data processing section 272. As a result, two-dimensional cyan and yellow images can be formed on the photosensitive material 16.

FIG. 13A shows the timing for outputting each of the image data processed by the data processing sections 270, 272 and 274. The reason for the occurrence of time delays shown in FIG. 13A at the time that the same line scan is made, is that positions where exposures are made by respective laser beams differ from each other (see FIG. 9) and time intervals from the start of the main scanning by the respective laser beams to the passage of the laser beams through the photosensor 58 differ from each other. Thus, since the positions for the recording of images by the respective laser beams are brought into agreement with each other, the images can be recorded without any variation in color.

The operation of the image recording apparatus in which the position displacements of the laser beams are input to and stored in the setting register 340 will now be described.

Figure 11:
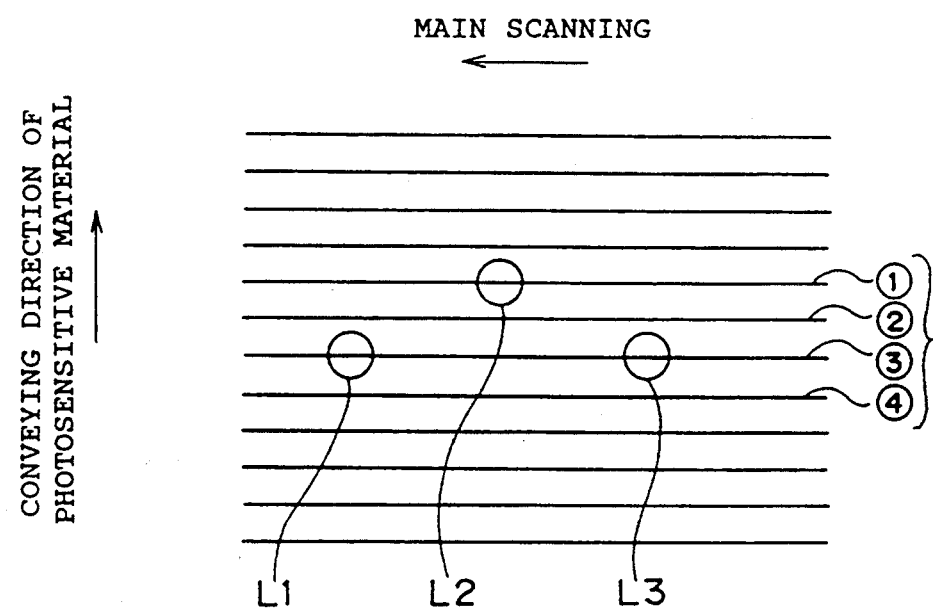
FIG. 11 is an image view showing the state of exposure of a photosensitive material by laser beams, which is main-scanned with the same beams and conveyed in a conveying direction.

When the laser beam L2 is positionally displaced or deviated two lines from the laser beams L1 and L3 as shown in FIG. 11, "2" is stored in the setting register 340. When each of the semiconductor lasers is activated according to timing shown in FIG. 13A, only an image corresponding to the semiconductor laser 42b, i.e., magenta is recorded in a state of being displaced by two lines. In the present embodiment, the output of the image data is delayed at a time interval corresponding to the deviated two lines. That is, the correcting memory 72 stores image data corresponding to the number of line scans depending on the deviated two lines. The timing for outputting the image data corresponding to the one line scan from the correcting memory 72 is delayed according to the deviated lines.

In order to avoid the confusion of the image data to be read four times corresponding to the one main scan, a plurality of image data corresponding to one main scan will be described as line data 1, 2, 3 and 4 according to the number of times in which the image data is read.

The image data corresponding to one main scan read from the frame memory 268 is in turn stored in the line buffer 70. The image data is outputted from the line buffer 70 in order of main scanning for each pixel. Then, the address generating counter 88 generates addresses corresponding to one line scan upon reading the pixels. The line data 1 corresponding to the one line scan are stored in the first line recording region 72A of the correcting memory 72 in order of the addresses (see FIG. 12A). Since, at this time, position displacement or deviation (two lines) of the laser beam L2 has been set, the address generating counter 88 continues upcounting without being reset even after completion of the storage of the line data 1.

Figure 12B:
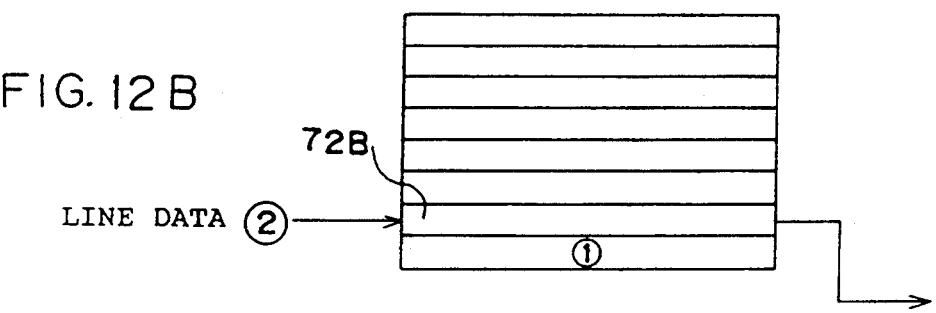

When the correcting memory 72 is then instructed to output the line data 2, the line data 2 are stored in the second line recording region 72B of the correcting memory 72 because the address generating counter 88 continues upcounting (see FIG. 12B). Since, at this time, the output of the counter 330 and a set value corresponding to the displacement (two lines) coincide with each other in the counter reset circuit 86, the counter reset circuit 86 resets the address generating counter 88. As a result, the address supplied to the correcting memory 72 from the address generating counter 88 is returned to an initial value (0).

Figure 12C:
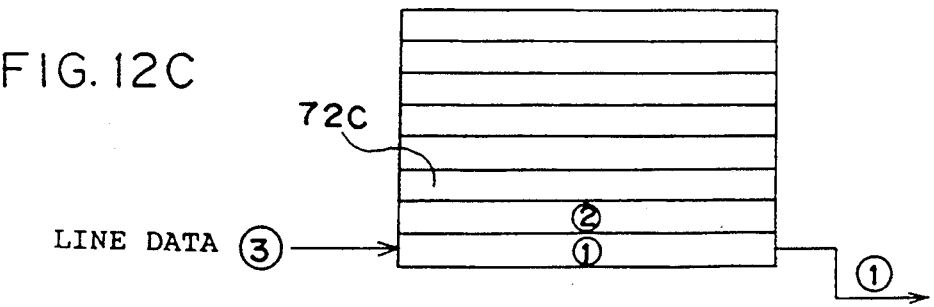

Next, when the correcting memory 72 is instructed to output the line data 3, the line data 3 are stored in the first line recording region 72A of the correcting memory 72 since the address generating counter 88 continues upcounting (see FIG. 12C). At this time, the correcting memory 72 successively outputs the stored line data 1 in accordance with the same address produced from the address generating counter 88 and stores the line data 3.

The LUT 76 outputs 10-bit drive data corresponding to one line scan based on the respective image data in the line data 1 outputted from the correcting memory 72. Then, the digital-analog converter 82 successively converts the drive data into analog values. Thus, the semiconductor laser 42b is successively controlled based on the amount of exposure corresponding to the image data equivalent to the one line scan.

In the same manner as described above, when the line data 4 is outputted, the address generating counter 88 continues upcounting without being reset. Therefore, the correcting memory 72 proceeds to the second line recording region 72B so as to output the stored line data 2 and store the line data 4 therein.

Thus, the correcting memory 72 stores the image data equivalent to the line scan corresponding to the set displacement and outputs the same according to the displacement in turn.

FIG. 13B shows the timing for outputting each of the image data processed by the data processing sections 270, 272 and 274 each of which effects the correction for position displacement. Thus, since the positions for the recording of images on the photosensitive material 16 by the respective laser beams are brought into alignment with each other by delaying the timing for outputting the image data used to drive the semiconductor laser 42b by position displacement, the images can be recorded without variation in color.

Accordingly, two-dimensional cyan, magenta and yellow images having no variation in color can be formed on the photosensitive material 16 by effecting all time above processes of each data processing sections.

Since the position displacements of the three laser beams are adjusted by changing exposure start timings of the respective laser beams in the present embodiment as described above, it is possible to effect correction on variations in color without any adjustment of a complex optical system. As a result, an image whose finished state is satisfactory can be obtained.

The LUT 76 employed in the present embodiment selects any one of the LUT banks thereof according to the line scan and utilizes it as shown in FIG. 14.

Described specifically, when the image data in the line data 1 are inputted, the LUT 76 is changed to the LUT bank 76A in response to a bank switching signal inputted from the microcomputer 240. Similarly, when the image data in the line data 2 are inputted, the LUT 76 is changed to the LUT bank 76B. Further, when the image data in the line data 3 are inputted, the LUT 76 is changed to the LUT bank 76C. Furthermore, when the image data in the line data 4 are inputted, the LUT 76 is changed to the LUT bank 76D.

Since these LUT banks 76A through 76D are constructed separately, the 10-bit drive data are also produced in separate form. Thus, the action of selecting any one of the four LUT banks 76A through 76D is equivalent to the synthetic application of 2-bit data to the LUT 76. Accordingly, the exposure control can be effected in the same manner as when the exposure is made on the photosensitive material 16 based on the 12-bit drive data even if information content is subtracted from the conventional 12-bit drive data outputted from the LUT to thereby produce the 10-bit drive data so that each semiconductor laser is activated.

Incidentally, the photosensitive material is exposed at each line scan by the laser beams having different exposure values even in the case of the same image data. In the present embodiment, however, the respective ends are exposed in a superimposed state at each line scan. Therefore, a variation in density can be controlled so as to fall within a range which is substantially free of density non-uniformity. Thus, the image can be recorded at the same gradation level as that employed in the conventional image recording apparatus of a type wherein the image is recorded based on the 12-bit drive data.

Thus, even when the LUT 76 outputs the 10-bit drive data, the image can be formed under the gradation equivalent to that used in the case of the output of the 12-bit drive data. It is therefore unnecessary to use the 12-bit type digital-analog converter which is high in cost. Thus, an inexpensive 10-bit type digital-analog converter can be used as an alternative.

The above-described embodiment describes, as an example, the case where position displacements of the laser beams are developed in the photosensitive-material conveying direction. The present invention is not necessarily limited to this embodiment. Even if position displacements in the main scanning direction occur in the laser beams, the present invention can be easily applied in the following manner.

The timing for starting the recording of an image using each of the laser beams L1, L2 and L3 respectively emitted from the semiconductor lasers 42a, 42b and 42c depends upon each of time intervals t1, t2 and t3 (see FIG. 13A) each extending from the start of the main scanning of each semiconductor laser to the passage of each laser beam through the photosensor 58. Thus, the timing for starting the recording of the image using each of the laser beams L1, L2 and L3 can be changed by making a change in each of these time intervals t1, t2 and t3.

Now, a reference clock CK is formed as illustrated in FIG. 15A in which a time interval required to record or read one pixel is divided into plural pulses (8 pulses, for example). A start signal (see FIG. 15B) for recording cyan or a cyan dye image by the semiconductor laser 42a and a pixel clock (see FIG. 15C) synchronized with the reference clock CK will next be regarded as standards for three colors, for example. Position variations in other colors with respect to the standard color cyan are corrected. That is, a start signal for recording magenta or a magenta dye image by the semiconductor laser 42b or yellow or a yellow dye image by the semiconductor laser 42c and a pixel clock (see FIG. 15D) synchronized with the reference clock CK are formed by being counted from the start signal for recording the standard color cyan in synchronism with the reference clock CK. Then, the count value is set so as to be variable. A time interval tx between the start signal for recording the standard color cyan and the start signal for recording either the magenta or the yellow can be varied by setting the count according to position displacement of the laser beam for magenta or yellow (see the direction indicated by the arrow A in FIG. 15E). By doing so, an image, which causes no position displacement, can be formed even during one main scan (i.e., line scanning).

The structure for correcting the position displacement of each laser beam in the main scanning direction may be added to a circuit for forming the timing for reading the image data from the correcting memory 72 employed in the aforementioned embodiment, i.e., each of the counter enable generating circuit 84, the counter reset circuit 86 and the address generating counter 88. Further, the timing for reading image data from a line memory may be set as described above by providing the line memory before the digital-analog converter 82.

Incidentally, the above embodiment describes, as an example, a case in which the present invention is employed in the image recording apparatus. The present invention is not necessarily limited to this embodiment. The present invention is also applicable to an image reading apparatus. As the image reading apparatus, there is proposed one wherein a surface to be read is irradiated with three laser beams substantially at the same exposure level or the surface is irradiated with the laser beams at an exposure level corresponding to a wavelength sensitivity characteristic of the surface to be read and the laser beams reflected from the surface or transmitted therethrough are detected by a photosensor (for example, a CCD image sensor or the like). There is also proposed, for example, a scanner for separating light reflected when a surface to be read is irradiated with white light into three colors by a color filter or the like and outputting image data corresponding to the quantity of the reflected light separated into the three colors. Since variations in light detection often occur in the photosensor, the present invention is suited to an apparatus for separately detecting the quantity of the reflected light separated into the three colors by using the scanner or the like.

Incidentally, the above-described embodiment describes the case in which the laser beam produced from each semiconductor laser is used as a light beam and the exposure is made by the laser beam. However, the light beam is not necessarily limited to the laser beam. For example, a light beam emitted by an LED element or a light beam emitted from a light source such as a halogen lamp may be used.

Having now fully described the invention, it will be apparent to those skilled in the art that many changes and modifications can be made without departing from the spirit or scope of the invention as set forth herein.

What is claimed is:

1. A method of making a two-dimensional exposure with a plurality of light beams by a main scan for making scans with said light beams in one direction and a sub-scan for making scans with said light beams in a direction intersecting the direction of said main scan, comprising the steps of:
   detecting a distance between a location exposed to at least one of said plurality of light beams and a second location exposed to an other of said light beams when said plurality of light beams are irradiated toward an object; and
   changing a timing for starting irradiation of said at least one of said plurality of light beams with respect to a second timing for starting irradiation of said other of said plurality of light beams, according to said distance to make the first and second locations substantially identical.

2. A method according to claim 1, wherein the object exposed to said plurality of light beams is a photosensitive material and said sub-scan is made so as to convey said photosensitive material in the direction intersecting the direction of said main scan.

3. A method according to claim 1, wherein said changing step is executed so that the timing for starting irradiation of said at least one of said plurality of light beams is changed depending on at least one of a number of main scanning lines in a sub-scanning direction that said at least one of said plurality of light beams is spaced from said other of said plurality of light beams and a time delay for irradiation of each of said light beams in the main scanning direction, said number and said time delay being calculated based on said distance detected in said detecting step.

4. A method according to claim 1, wherein said plurality of light beams have different wavelengths.

5. A method according to claim 4, wherein said light beams having different wavelengths comprise light beams having wavelengths corresponding to cyan, magenta and yellow records.

6. A method according to claim 1, wherein said change in the timing is made by inputting data about said distance to counter means and inputting image data included in each of said plurality of light beams into storing means connected to said counter means.

7. A method according to claim 6, wherein said counter means specifies addresses corresponding to said image data inputted to said storing means based on said distance data.

8. A method according to claim 6, wherein said counter means and said storing means are respectively provided corresponding to the number of wavelengths of said plurality of light beams.

9. A method according to claim 6, wherein said storing means is activated in a read-modify write mode.

10. A method according to claim 9, wherein said storing means is an SRAM.

11. A method of effecting, a predetermined number of times and in a predetermined direction, a main scan for making scans with a plurality of light beams in one direction and a sub-scan for making scans with said light beams in a direction intersecting the direction of said main scan in such a manner that at least adjacent portions to be exposed overlap, thereby making a two-dimensional exposure, comprising the steps of:
   detecting a distance between a location exposed to at least one of said plurality of light beams and a second location exposed to an other of said light beams when said plurality of light beams are irradiated toward an object; and
   changing a timing for starting irradiation of said at least one of said plurality of light beams with respect to a second timing for starting irradiation of said other of said plurality of light beams, according to said distance to make the first and second locations substantially identical.

12. A method according to claim 11, wherein the object exposed to said plurality of light beams is a photosensitive material and said sub-scan is made so as to convey said photosensitive material in the direction intersecting the direction of said main scan.

13. A method according to claim 11, wherein said changing step is executed so that the timing for starting irradiation of said at least one of said plurality of light beams is changed depending on at least one of a number of main scanning lines in a sub-scanning direction that said at least one of said plurality of light beams is spaced from said other of said plurality of light beams and a time delay for irradiation of each of said light beams in the main scanning direction, said number and said time delay being calculated based on said distance detected in said detecting step.

14. A method according to claim 11, wherein said plurality of light beams have different wavelengths.

15. A method according to claim 14, wherein said light beams having different wavelengths comprise light beams having wavelengths corresponding to cyan, magenta and yellow records.

16. A method according to claim 11, wherein said change in the timing is made by inputting data about said distance to counter means and inputting image data included in each of said plurality of light beams into storing means connected to said counter means.

17. A method according to claim 16, wherein said counter means specifies addresses corresponding to said image data inputted to said storing means based on said distance data.

18. A method according to claim 16, wherein said counter means and said storing means are respectively provided corresponding to the number of wavelengths of said plurality of light beams.

19. A method according to claim 16, wherein said storing means is activated in a read-modify write mode.

20. A method according to claim 19, wherein said storing means is an SRAM.

* * * * *